(12) United States Patent
Hidalgo et al.

(10) Patent No.: US 8,957,162 B2
(45) Date of Patent: Feb. 17, 2015

(54) ELASTOMER MATERIAL, AND METHOD FOR OBTAINING SAME

(75) Inventors: Manuel Hidalgo, Brignais (FR); Fabien Debaud, Lyons (FR)

(73) Assignee: Arkema France, Colombes (FR)

( * ) Notice: Subject to any disclaimer, the term of this patent is extended or adjusted under 35 U.S.C. 154(b) by 149 days.

(21) Appl. No.: 13/119,272

(22) PCT Filed: Sep. 15, 2009

(86) PCT No.: PCT/FR2009/051733
§ 371 (c)(1),
(2), (4) Date: Apr. 6, 2011

(87) PCT Pub. No.: WO2010/031956
PCT Pub. Date: Mar. 25, 2010

(65) Prior Publication Data
US 2011/0183098 A1    Jul. 28, 2011

(30) Foreign Application Priority Data

Sep. 18, 2008 (FR) ..................... 08 56270

(51) Int. Cl.
C08C 19/22 (2006.01)
C08F 8/30 (2006.01)
C08J 3/24 (2006.01)

(52) U.S. Cl.
CPC . C08C 19/22 (2013.01); C08F 8/30 (2013.01); C08J 3/243 (2013.01); C08J 2323/08 (2013.01)
USPC .................. 525/330.5; 525/327.3; 525/327.6; 525/331.9; 525/332.9; 525/375

(58) Field of Classification Search
CPC ............................... C08C 19/22; C08C 19/40
USPC ............. 525/375, 331.9, 332.9, 330.5, 327.3, 525/327.6
See application file for complete search history.

(56) References Cited

U.S. PATENT DOCUMENTS

| | | | |
|---|---|---|---|
| 6,809,157 B2 | 10/2004 | Chino et al. | |
| 8,242,207 B2 * | 8/2012 | Dufaure et al. | 525/66 |
| 2004/0010090 A1 | 1/2004 | Chino et al. | |
| 2004/0059060 A1 | 3/2004 | Chino et al. | |
| 2006/0094829 A1 * | 5/2006 | Chino et al. | 525/301 |
| 2008/0103287 A1 * | 5/2008 | Chino et al. | 528/421 |
| 2008/0175139 A1 | 7/2008 | DiPietro et al. | |
| 2008/0177303 A1 * | 7/2008 | Anthamatten et al. | 606/231 |

FOREIGN PATENT DOCUMENTS

DE       101 31 659 A1     10/2002
WO   WO 2008/099125 A1 *  8/2008

OTHER PUBLICATIONS

Chang et al., Polymer International 56 (2007) 694-698.*
Chang, et al.; *Thermomechanical Properties and Shape Memory Effect of Expoxidized Natural Rubber Corsslinked by 3-Amino-1, 2, 4-Triazole*: Polymer International, vol. 56, 2007,pp. 694-698, p. 697, left-hand column. XP002520252.
Schadebrodt, J., et al; *New Thermoreversible and Combined Networks Via Hydrolilylation Withneutral Pt. (II)-Complexes*; Kautschuk Und Gummi-Kunststoffe, Huthig Verlag, Hidelberg, DE; vol. 52, No. 9, Sep. 1, 1999, pp. 555-564, XP000859668; ISSN: 0948-3276, p. 560.
Hilger, C. ,et al; *Multiphase Thermoplastic Elastomers by Combination of Covalent and Association Chain Structures: 2. Small-Strain Dynamic Mechanical Properties*; Polymer, Elsevier Science Publishers B.V. GB, vol. 31, No. 5, May 1, 1990, pp. 818-823, XP024115355, ISSN: 0032-3861, p. 819, right-hand column; Figure 1.
Chino, et al.; *Thermoreversible Cross-Linking Rubber Using Supramolecular Hydrogen-Bonding Networks*; Macromolecules, vol. 34, No. 26, Dec. 18, 2001, pp. 9201-9204, XP002520253 scheme table 1.
Database Compendex; Engineering Information, Inc., New York, NY, US 2005; Nakamura, K-I, et al; *Polymer Networks With Thermoreversible Crosslinks*; XP002520254; Database Accession No. E2006159817172 Abstract & Polymer Preprints, Japan—54th SPSJ Symposium on Macromolecules—Polymer Preprints, Japan 2005, Society of Polymer Science JP, vol. 54, No. 2, 2005 p. 3668.
International Search Report Issued for Application No. PCT/FR2009/051733, completed Jan. 15, 2010 and mailed Jan. 21, 2010.

* cited by examiner

*Primary Examiner* — Roberto Rabago
(74) *Attorney, Agent, or Firm* — RatnerPrestia

(57) ABSTRACT

The invention relates to an elastomer material including flexible polymer chains containing crosslinking bridges having covalent bonds and crosslinking bridges having noncovalent bonds. The invention also relates to a method for preparing such elastomer material.

9 Claims, No Drawings

ELASTOMER MATERIAL, AND METHOD FOR OBTAINING SAME

CROSS-REFERENCE TO RELATED APPLICATION

This application is a national stage application under 35 U.S.C. §371 of PCT/FR2009/051733, filed Sep. 15, 2009, which claims benefit to French application FR 0856270, filed on Sep. 18, 2008, all of which are hereby incorporated by reference.

FIELD OF INVENTION

The invention relates to an elastomer material comprising crosslinking bridges having covalent bonds, obtained by thermally irreversible permanent chemical crosslinking, and, on the other hand, crosslinking bridges having noncovalent bonds, in particular thermally reversible ones, obtained by modification of the polymer chains so as to make them carriers of associative groups capable of forming said noncovalent bonds. The modification of the chains with the associative groups can be carried out by functionalization, in particular using functional monomers used during the polymerization, or by grafting.

BACKGROUND OF THE INVENTION

It is well known that elastomer materials acquire the bulk of their good applicational properties when they are crosslinked. The crosslinking of elastomers provides them not only with an improvement in their mechanical properties but also with an extension of the temperature ranges in which they retain the elastic and flexibility properties which characterize them.

Thus, for example, natural rubber, resulting from the latex of the rubber tree, has to be crosslinked in order to acquire all its properties of dimensional stability and of elasticity; without the crosslinking, natural rubber is a tacky material of little use in the majority of situations.

Both natural rubber and the crosslinking thereof in order to render it useful were already known to the pre-Columbian civilizations, such as the Maya, who used it, inter alia, in the manufacture of bouncy balls used in the very widespread ball game. The methods of manufacture of this material, known as ulli in Nahuatl, the language of the Aztecs, which gave rise to the Spanish (Mexican) name hule, in particular those which make it possible to crosslink it, were nevertheless lost after the collapse of these civilizations. The chemical crosslinking of rubbers, in particular the crosslinking with sulfur, a process known today under the name of vulcanization, owes much to the work of Charles Goodyear who, furthermore, was attempting more to develop an impermeable coating from natural latex rather than a bouncy elastic material.

The chemical crosslinking is characterized by the establishment of covalent chemical bonds between polymer chains of the base elastomer material, for example natural rubber. In this way, the polymer chains, which are generally fairly long, should form a three-dimensional network, often represented in two dimensions under the appearance of a net, the mesh of which is more or less tight according to the crosslinking density (or the density of crosslinking nodes). The crosslinking density has a crucial influence on the main properties of the elastomeric chemical network, such as the tensile or compressive modulus, the hardness, the tear strength, or the properties at failure (stress, elongation).

Numerous methods exist for the thermally irreversible permanent chemical crosslinking of elastomer materials, the most widely used among which are those based on sulfur-comprising compounds, of use in the crosslinking of elastomer materials comprising unsaturated bonds in their main chains, such as natural or synthetic polyisoprene, polybutadiene, polychloroprene and their copolymers, in particular with styrene, acrylonitrile and acrylic monomers. Sulfur is capable of forming mono-, bi- or polysulfide bridges between two chains, by reaction with unsaturated bonds initially present in the latter. Another very common method is that of chemical crosslinking with peroxides, which, via radical reactions, tear off H. radicals from the polymer chains, which are then capable of combining together via the recombination of the C. radicals thus created.

Industrial methods for the chemical crosslinking of elastomers involve more or less complex formulations in which may be found, for example, in addition to the main crosslinking agents, such as sulfur or peroxides, accelerators, fillers, heat stabilizers and radiation stabilizers, short stoppers or moderating agents, and the like.

There are many advantages to the thermally irreversible chemical crosslinking of elastomers in terms of mechanical and thermal properties of the latter but it involves the disadvantage, sometimes major, of generating thermoset materials which can be processed just once and for a time which is sometimes short preceding the crosslinking reaction. This is because, as chemical crosslinking is permanent, once the material is crosslinked, it can no longer be reworked or recycled thermomechanically.

In order to overcome this major disadvantage, new technologies were developed in order to produce elastomer materials having nonpermanent crosslinking. This is also referred to as reversible crosslinking or physical crosslinking, which is completely different from permanent chemical crosslinking. The elastomer materials having nonpermanent crosslinking, which can thus be reworked thermomechanically, in particular through the conventional processing techniques employed for polymers, such as extrusion, injection molding or the various molding techniques, such as rotomolding, form the family of the thermoplastic elastomers. One of the commonest means for obtaining thermoplastic elastomer materials consists in manufacturing block copolymer salternately or multialternately comprising flexible segments of non-crosslinked elastomer type and rigid segments. Examples of block copolymers which can be used as thermoplastic elastomers are styrene block copolymers, such as poly(styrene-b-butadiene-b-styrene)s (SBSs) or polystyrene-b-isoprene-b-styrene)s (SISs). The rigid blocks, in this instance polystyrene blocks, associate with one another, constituting, at the temperatures of use (lower than the glass transition temperature or than the softening point of the rigid blocks), nodules within a flexible matrix formed by the flexible blocks. This is obtained by adjusting the proportions of the two types of blocks. In this way, the material behaves as a combination of elastomeric flexible chains, combined with one another via the aggregates of rigid blocks which act as crosslinking nodes. However, as the rigid blocks can soften and optionally flow by raising the temperature, the material can be destructured and thus reworked or processed thermomechanically. The crosslinking nodes formed by the rigid blocks are thus nonpermanent nodes or physical nodes.

It is also possible to obtain thermoplastic elastomers by dispersion, in a nonelastomeric thermoplastic matrix, of a fraction of crosslinked or noncrosslinked elastomeric phase. This composite strategy makes it possible to introduce the elasticity and the rubbery behavior into a reprocessable thermoplastic matrix.

Another strategy for the formation of sites capable of crosslinking physically within base polymer chains is that of the chemical modification of these chains by functionalization or by grafting. It is a matter of including on the base chains, by functionalization using functional monomers introduced during the polymerization or by grafting, preferably covalent grafting, self-complementary units capable of associating with one another via nonpermanent physical interactions, such as ionic interactions, hydrogen bonds, ion-dipole interactions or dipole-dipole interactions.

It is also possible to introduce, onto the base elastomeric chains, complementary units which are different from one another but which are capable of reacting via a thermally reversible chemical reaction.

In this specific case, reference is not made to physical crosslinking but to reversible chemical crosslinking; in any case, this type of crosslinking, like physical crosslinking proper, is not permanent, unlike conventional chemical crosslinking.

Patent application U.S. Pat. No. 6,746,562 describes different systems where base elastomeric chains have been grafted either with units capable of reacting chemically in a reversible manner or with units capable of interacting physically via noncovalent bonds, such as hydrogen bonds. In both cases, the result is that of the preparation of elastomer materials which are thermally reversible and thus capable of being reworked or reshaped or recycled. The purely physical reversible crosslinking or the reversible crosslinking based on reversible chemical reactions as described above has, in spite of everything, the major disadvantage, in comparison with conventional chemical crosslinking, of not making it possible to achieve the very high level performance of chemically crosslinked rubbers, in particular in terms of mechanical properties, such as creep strength and elastic behavior over sufficiently broad temperature ranges.

The applicant company has now found that it is possible to crosslink polymer chains of low, moderate or high molecular weight with both conventional chemical crosslinking, thus permanent crosslinking, and reversible crosslinking, preferably physical crosslinking and more preferably still crosslinking based on hydrogen bonds. The result is that of the production of materials having good dimensional stability and good mechanical properties by virtue of the permanent chemical crosslinking, while being easier to process and having specific properties, such as, for example, adjustable mechanical properties, due to the introduction of a different (nonpermanent) crosslinking mode capable of changing as a function of the parameters of the operating environment, such as, for example, the temperature or the time characteristic of stress.

SUMMARY OF INVENTION

A subject matter of the invention is thus an elastomer material comprising flexible polymer chains associated with one another, on the one hand, via crosslinking bridges having permanent covalent bonds and, on the other hand, via crosslinking bridges having noncovalent bonds.

DETAIL DESCRIPTION OF CERTAIN EMBODIMENTS OF THE INVENTION

The term "crosslinking bridges having permanent covalent bonds" is understood to mean, within the meaning of the present invention, thermally irreversible crosslinking bridges, the chemical crosslinking being permanent; once the material is crosslinked, it can no longer be reworked or recycled thermomechanically.

The term "crosslinking bridges having noncovalent bonds" is understood to mean, within the meaning of the present invention, crosslinking bridges capable of reversibly dissociating as a function of the variation in the parameters of the operating environment, such as the temperature or the mechanical stress time.

The term "flexible polymer" is understood to mean, within the meaning of the present invention, a rubbery polymer exhibiting a glass transition temperature lower than its temperature of use, in other words a polymer material which is flexible at the temperature of use. Such a material preferably exhibits a Young's modulus, measured at the temperature of use, comprised between 10 000 Pa and 100 000 000 Pa and preferably comprised between 50 000 Pa and 10 000 000 Pa.

Another subject matter of the invention is a process for producing a material in accordance with the invention.

By way of preamble, it should be noted that the expression "comprised between" must be interpreted, in the present description, as including the limits mentioned.

The materials in accordance with the invention can be obtained by bridging flexible polymer chains according to permanent or thermally irreversible chemically crosslinking mechanisms and reversible crosslinking mechanisms. The continuation of the description describes in more detail the flexible polymers which can be used according to the invention, the chemical crosslinking of the latter to form permanent chemical crosslinking bridges and also the functionalization or grafting of the polymer to form reversible crosslinking bridges.

Flexible Polymers

Mention may be made, among flexible base polymers of use in the preparation of the materials of the invention, as nonexclusive examples, of polybutadiene, polyisoprene, polychloroprene and their hydrogenated versions, polyisobutylene, block copolymers of butadiene and of isoprene with styrene, and also their hydrogenated versions, such as poly (styrene-b-butadiene) (SB), poly(styrene-b-butadiene-b-styrene) (SBS), poly(styrene-b-isoprene-b-styrene) (SIS), (styrene-b-(isoprene-stat-butadiene)-b-styrene) or poly(styrene-b-isoprene-b-butadiene-b-styrene) (SIBS), hydrogenated SBS (SEBS), poly(styrene-b-butadiene-b-methyl methacrylate) (SBM) and its hydrogenated version (SEEM), poly(m-ethyl methacrylate-b-butyl acrylate-b-methyl methacrylate) (MAN), poly(styrene-b-butyl acrylate-b-styrene) (SAS), random copolymers of butadiene with styrene (SBR) and acrylonitrile (NBR) and their hydrogenated versions, butyl or halogenated rubbers, polyethylenes, polypropylenes, ethyl/vinyl alcohol copolymers, ethylene/propylene and ethylene/propylene/diene (EPDM) copolymers, copolymers of ethylene with acrylic and vinyl monomers, such as copolymers of ethylene and vinyl acetate, copolymers of ethylene, vinyl acetate and maleic anhydride, available from Arkema under the Orevac® trade name, copolymers of ethylene and acrylic ester, copolymers of ethylene, acrylic ester and maleic anhydride, copolymers of ethylene, acrylic ester and functional acrylic ester, such as glycidyl acrylate or methacrylate, available from Arkema under the Lotader® trade name, flexible acrylic polymers or copolymers, such as resins based on methacrylic esters, such as polybutyl acrylate and its copolymers with styrene, or on other acrylic or vinyl monomers, and also their blends.

Preferably, use is made, as flexible polymer, of one or more elastomers chosen from the following list which are advantageously suitable for manufacture of rubber objects.

Thus, preferably, the flexible polymer according to the invention can comprise one or more diene elastomers. The term "diene elastomers" is understood to mean more specifically:

(1) homopolymers obtained by polymerization of a conjugated diene monomer having from 4 to 22 carbon atoms, such as, for example: 1,3-butadiene, 2-methyl-1,3-butadiene, 2,3-dimethyl-1,3-butadiene, 2,3-diethyl-1,3-butadiene, 2-methyl-3-ethyl-1,3-butadiene, 2-chloro-1,3-butadiene, 2-methyl-3-isopropyl-1,3-butadiene, 1-phenyl-1,3-butadiene, 1,3-pentadiene or 2,4-hexadiene;

(2) copolymers obtained by copolymerization of at least two of the abovementioned conjugated dienes with one another or by copolymerization of one or more of the abovementioned conjugated dienes with one or more ethylenically unsaturated monomers chosen from: vinylaromatic monomers having from 8 to 20 carbon atoms, such as, for example: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene;

vinyl nitrile monomers having from 3 to 12 carbon atoms, such as, for example, acrylonitrile or meth-acrylonitrile;

acrylic ester monomers derived from acrylic acid or methacrylic acid with alkanols having from 1 to 12 carbon atoms, such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate;

the copolymers can comprise between 99 and 20% by weight of diene units and between 1 and 80% by weight of vinylaromatic, vinylnitrile and/or acrylic ester units;

(3) ternary copolymers obtained by copolymerization of ethylene and of an α-olefin having from 3 to 6 carbon atoms with a nonconjugated diene monomer having from 6 to 12 carbon atoms, such as, for example, the elastomers obtained from ethylene and propylene with a nonconjugated diene monomer of the abovementioned type, such as, in particular, 1,4-hexadiene, ethylidene-norbornene or dicyclopentadiene (EPDM elastomer);

(4) natural rubber;

(5) copolymers obtained by copolymerization of isobutene and isoprene (butyl rubber), and also the halogenated, in particular chlorinated or brominated, versions of these copolymers;

(6) a blend of several of the above-mentioned elastomers (1) to (5) with one another.

The polymers which can be used according to the invention can be obtained according to conventional polymerization techniques well known to a person skilled in the art.

Modification of the Polymer by Chemical Crosslinking

Permanent chemical crosslinking is carried out by conventional means, such as sulfur vulcanization, crosslinking with peroxides or crosslinking with at least bifunctional crosslinking agents capable of reacting chemically with reactive sites present in at least two polymer chains. All possible chemical combinations between reactive sites on polymer chains and at least bifunctional crosslinking agents are of use provided that they make possible the establishment of chemical crosslinking bridges having permanent covalent bonds between polymer chains. Thus, for example, for a base polymer comprising reactive sites of carboxylic acid type, an appropriate crosslinking agent can be any at least difunctional molecule capable of reacting chemically with these reactive sites, such as, for example, a diamine, a diol, a diepoxy, a diisocyanate and their respective combinations, such as, for example, an alkanolamine. In another example, for a base polymer comprising reactive sites of epoxy (or glycidyl) type, the crosslinking agents, at least bifunctional with regard to the epoxys, can be, for example, primary amines, diamines, diols or dicarboxylic acids.

Modification of the Polymer by Grafting or by Functionalization in Order to Include Therein Reversible Associative Units The reversible crosslinking rendered possible by the presence, in the material which is a subject matter of the invention, of crosslinking bridges having noncovalent bonds requires the introduction or the inclusion of associative groups on flexible polymer chains.

According to a preferred form of the invention, the reversible associations established are physical associations and, according to an even more preferred form of the invention, the physical associations are hydrogen bonds.

Preferably, the polymers employed in the material which is the subject matter of the invention are modified so that these polymers carry associative groups based on a nitrogenous heterocycle.

To do this, a modifying agent can be reacted with the polymer to be modified. More specifically, the modification of the polymer can be carried out by grafting, that is to say by the reaction of said polymer with a modifying agent carrying, on the one hand, an associative group based on a nitrogenous heterocycle and, on the other hand, a reactive group chosen, for example, from amine, mercaptan, epoxy, isocyanate, anhydride, alcohol or acid groups, preferably an amine group, said reactive group forming a covalent bond with a reactive functional group, such as an acid, anhydride, alcohol, mercaptan, amine, epoxy or isocyanate functional group, preferably an anhydride or epoxy functional group, carried by said polymer.

The term "associative group" is understood to mean groups capable of associating with one another via hydrogen, ionic and/or hydrophobic bonds. According to a preferred form of the invention, they are groups capable of associating via hydrogen bonds comprising a nitrogenous heterocycle, preferably a dinitrogenous heterocycle, generally having 5 or 6 ring members. Examples of associative groups which can be used according to this preferred form of the invention are imidazolidinyl, triazolyl, triazinyl, bisureyl or ureidopyrimidyl groups. The imidazolidinyl group is preferred.

Another way of modifying the polymers employed in the material which is a subject matter of the invention so that these polymers carry associative groups based on a nitrogenous heterocycle is the functionalization of the polymer during its polymerization using functional monomers capable of copolymerizing and therefore of being thus inserted into the very backbone of the polymer chains while carrying said associative groups based on a nitrogenous heterocycle. Mention may be made, as examples of monomers which make possible the introduction of imidazolidinyl groups into the polymer, of ethylimidazolidone methacrylate and ethylimidazolidone methacrylamide.

The modifying agent can thus correspond to any one of the formulae (B1) to (B4):

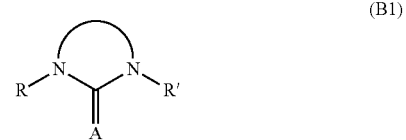

(B1)

-continued

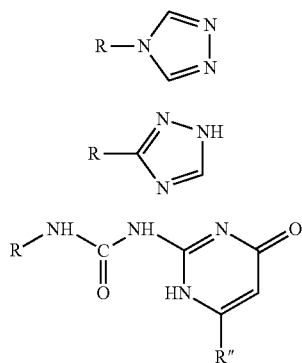

where:
R denotes a unit comprising at least one reactive group, including a polymerizable group (case of introduction by copolymerization with functional monomers carrying associative groups),
R' denotes a hydrogen atom,
R" denotes a hydrogen atom or any group,
A denotes an oxygen or sulfur atom or an —NH group, preferably an oxygen atom.

Preferred examples of modifying agents are 2-amino-ethylimidazolidone (UDETA), 1-(2-[(2-aminoethyl)amino]ethyl)imidazolidone (UTETA), 1-(2-[{2-(2-aminoethylamino)ethyl}amino]ethyl)imidazolidone (UTEPA), N-(6-aminohexyl)-N'-(6-methyl-4-oxo-1,4-dihydropyrimidin-2-yl)area (UPy), 3-amino-1,2,4-triazole (3-ATA) and 4-amino-1,2,4-triazole (4-ATA). UDETA is preferred for use in the present invention.

Some of these compounds can be obtained by reaction of urea with a polyamine. For example, UDETA, UTETA and UTEPA can be respectively prepared by reacting urea with diethylenetriamine (DETA), triethylenetetramine (TETA) and tetraethylenepentamine (TEPA).

When the introduction of associative groups takes place by grafting, the grafting process is carried out by reacting the modifying agent and the polymer carrying the reactive functional groups.

This stage can be carried out in the molten state, for example in an extruder or an internal mixer, at a temperature which can range from 50° C. to 300° C. and preferably from 200° C. to 280° C. The modifying agent is blended with a polymer alone or with the help of an additive which makes possible the impregnation of the solid polymer particles by the premelted modifying agent. The solid blend, before introduction into the extruder or the mixer, can be rendered more homogeneous by refrigerating in order to solidify the modifying agent. It is also possible to meter the latter into the extruder or the mixer after the polymer to be grafted has started to melt. The time at the grafting temperature can range from 30 seconds to 5 hours. The modifying agent can be introduced into the extruder in the form of a masterbatch in a polymer, which can preferably be the polymer to be grafted. According to this method of introduction, the masterbatch can comprise up to 30% by weight of modifying agent; subsequently, the masterbatch is "diluted" in the polymer to be grafted during the grafting operation.

According to another possibility, the grafting can be carried out by reaction in a solvent phase, for example in anhydrous chloroform. In this exemplary case (anhydrous chloroform), the reaction temperature can range from 5° C. to 75° C., for a time ranging from a few minutes to a day and at polymer concentrations before grafting comprised between 1 and 50% by weight, with respect to the total weight of the solution.

The number of associative groups introduced onto the polymer must be sufficient to produce materials having good dimensional stability and good mechanical properties by virtue of the permanent chemical crosslinking, while being easier to process and having specific properties, such as, for example, adjustable mechanical properties, due to the introduction of a different (nonpermanent) crosslinking mode capable of changing as a function of the parameters of the operating environment, such as, for example, the temperature or the time characteristic of stress.

This number can be simply adjusted by varying the amount of modifying agent or by adjusting the reaction time and temperature. It is generally preferable for the amount of modifying agent to represent from 0.1 to 20% by weight, more preferably from 0.5 to 10% by weight, with respect to the weight of the unmodified polymer, and/or for the mean number of associative groups per polymer chain to be comprised between 1 and 200.

Thus, preferably, the degree of modification of the polymer by grafts or comonomers carrying associative groups is from 0.1 to 20% by weight of modifying agent with respect to the polymer.

In a preferred embodiment, the mean number of associative groups per polymer chain after modification is comprised between 1 and 200.

Thus, the ratio of the percentage of crosslinking bridges having permanent covalent bonds to the percentage of crosslinking bridges having noncovalent bonds is comprised between 99/1 and 1/99 and preferably comprised between 90/10 and 20/80.

In the case where the reactive functional group carried by the polymer to be modified by grafting is an anhydride functional group, the latter can be created on said polymer by cyclization of acid functional groups. This cyclization process can advantageously be carried out under basic catalysis conditions. The preferred basic catalysts include sodium hydroxide and sodium methoxide $NaOCH_3$. The cyclization can be carried out by passing the polymer carrying acid groups through a single- or twin-screw extruder in the presence of a catalyst and optionally of other additives, such as lubricants, antioxidants, dyes and/or optical correctors in order to give gloss and to reduce yellowing. The extrusion temperature can be comprised between 200° C. and 300° C. and preferably between 250° C. and 280° C. One or more extrusion passes can be carried out in order to obtain the desired level of cyclization (for example, formation of glutaric anhydride). According to another possibility, the cyclization reaction can be carried out under high vacuum. The degree of cyclization can be controlled in order to adjust the level of anhydride functional groups obtained, which can, for example, range from 0.1 to 20 mol %.

When the introduction into the base polymer of the associative groups capable of creating in fine the physical crosslinking takes place by grafting, this grafting can take place before, during or after the permanent chemical crosslinking described above.

When this introduction of associative groups takes place by the functionalization during the polymerization of the chains of flexible polymer to be modified, the conventional chemical crosslinking can take place during or after the polymerization.

According to another alternative form of the invention, the reactive groups of the modifying agent, that is to say the molecules used to introduce associative groups capable of creating interchain physical bonds, are also capable of bringing about permanent chemical crosslinking.

These reactive groups can be amine, mercaptan, epoxy, isocyanate, anhydride, alcohol or acid, preferably amine.

According to another alternative form of the invention, the modifying agent is also capable of bringing about permanent chemical crosslinking.

Thus, in a specific embodiment of the invention, the permanent crosslinking bridges having a covalent bond and the crosslinking bridges having noncovalent bonds are formed by virtue of the modifying agent.

By way of example, mention may be made, as modifying agent, of UDETA, which is capable of bringing about permanent chemical crosslinking both by the primary amine reactive group and by the secondary amine carried by the heterocycle constituting the associative group.

Another subject matter of the invention is thus a process for the preparation of a crosslinked material based on a flexible polymer comprising the following stages:
(a) the permanent chemical crosslinking of said polymer,
(b) the physical crosslinking of said polymer (i) by grafting of associative groups based on a nitrogenous heterocycle or (ii) by functionalization during the polymerization of said polymer with comonomers carrying associative groups based on a nitrogenous heterocycle.

Stages a) and b)(i) can take place in any order or be simultaneous.

Additives

The material according to the invention can be used as is or in single-phase or multi-phase blends with one or more compounds, such as oil fractions, solvents, inorganic and organic fillers, plasticizers, tackifying resins, processing aids, lubricants, antioxidants, antiradiation (anti-UV) additives, pigments and/or dyes.

In particular, additives capable of being added to the material according to the invention are especially:
  lubricants, such as stearic acid and its esters, waxy esters, polyethylene waxes, paraffin wax or acrylic lubricants,
  dyes,
  inorganic or organic pigments, such as those described in the document "Plastics Additives and Modifiers Handbook, Section VIII, Colorants", J. Edenbaum, Ed., Van Nostrand, pages 884-954. Mention may be made, as examples of pigments which can be used, of carbon black, titanium dioxide, clay, metal particles or treated mica particles of the Iriodin® brand sold by Merck,
  plasticizers,
  heat and/or UV stabilizers, such as tin stearate, lead stearate, zinc stearate, cadmium stearate, barium stearate or sodium stearate, including Thermolite® from Arkema,
  costabilizers, such as epoxidized natural oils,
  antioxidants, for example phenolic, sulfur-comprising or phosphite antioxidants,
  fillers or reinforcing agents, in particular cellulose fillers, talc, calcium carbonate, mica or wollastonite, glass or metal oxides or hydrates,
  antistatic agents,
  fungicides and biocides,
  blowing agents used for the manufacture of expanded components, such as azodicarbonamides, azobis-isobutyronitrile or diethyl azobisisobutyrate,
  flame retardants, including antimony trioxide, zinc borate and brominated or chlorinated phosphate esters,
  solvents, and
  their mixtures.

The material which is a subject matter of the invention can be used in the manufacture of various articles, in particular by calendering, extrusion, extrusion-blow-molding, conventional molding, injection molding, rotomolding, thermoforming, and the like.

It can thus be used to manufacture any object made of rubber, such as leaktight seals, thermal or acoustic insulators, tires, cables, sheaths, footwear soles, packagings, coatings (paints, films or cosmetic products), patches (cosmetic or dermopharmaceutical) or other systems for trapping and releasing active principles, dressings, elastic clamp collars, vacuum pipes, pipes and flexible tubing for the transportation of fluids and generally components which have to exhibit an elastic behavior, while having good flexibility, good fatigue strength, good impact strength and good tear strength. These materials can also form part of adhesive or cosmetic compositions or ink, varnish or paint formulations.

A better understanding of the invention will be obtained in the light of the following examples, which are given solely for the purposes of illustration and which do not have the aim of limiting the scope of the invention, which is defined by the appended claims.

EXAMPLES

In the following examples, the base flexible polymer to be chemically and physically crosslinked is a copolymer of ethylene, methyl acrylate and glycidyl methacrylate, sold by Arkema under the name of Lotader® AX 8900. This base polymer is formulated using fillers (carbon black and calcium carbonate), a plasticizer which renders the polymer more flexible at ambient temperature, a lubricant and a processing aid. The typical formulation of the base material and the functions of the ingredients are given in table I.

TABLE I

| Product | Function | Parts per 100 parts of polymer |
| --- | --- | --- |
| Lotader ® AX8900 | Base polymer | (100 parts) |
| Carbon black N 772 | Filler | 30 |
| Calcium carbonate | Filler | 30 |
| Nycoflex ® ADB 30 | Plasticizer | 10 |
| Stearic acid | Lubricant/Antitack agent | 1.5 |
| Ofalub ® SEO | Processing aid | 1 |

These products are blended in an internal mixer of Brabender® or Haake® type, at a temperature greater than the melting point of the epoxidized polymer (60° C.), until the blend becomes homogeneous. The blend thus obtained is subsequently blended with different amounts of the modifying agent carrying associative groups, 2-aminoethylimidazolidone (UDETA), and again passed through the mixer until a homogeneous blend is obtained. The compositions of the blends with different contents of UDETA are shown in table II.

TABLE II

| Product | Blend 1 (parts per 100 parts of polymer) | Blend 2 (parts per 100 parts of polymer) | Blend 3 (parts per 100 parts of polymer) | Blend 4 (parts per 100 parts of polymer) |
| --- | --- | --- | --- | --- |
| Lotader ® AX8900 | (100) | (100) | (100) | (100) |
| N 772 | 30 | 30 | 30 | 30 |
| CaCO$_3$ | 30 | 30 | 30 | 30 |
| Nycoflex ® | 10 | 10 | 10 | 10 |

TABLE II-continued

| Product | Blend 1 (parts per 100 parts of polymer) | Blend 2 (parts per 100 parts of polymer) | Blend 3 (parts per 100 parts of polymer) | Blend 4 (parts per 100 parts of polymer) |
|---|---|---|---|---|
| ADB 30 | | | | |
| Stearic acid | 1.5 | 1.5 | 1.5 | 1.5 |
| Ofalub ® SEO | 1 | 1 | 1 | 1 |
| UDETA | 8.47 | 4.18 | 6.27 | 10 |

The change in the rheological properties due to the addition of the UDETA can be monitored in a rheometer which makes it possible to measure, on a pellet of the material, the torsional moment at different temperatures or different times. The tests can also be carried out in dynamic mode with the frequency as parameter. The addition of UDETA to this formulation brings about, as a function of the temperature or the time at a given temperature, an increase in the moment which can be associated with the grafting of the UDETA to the polymer chains but also with a chemical crosslinking of the latter also brought about by the UDETA. In table II, blend 1 is stoichiometric between amines of the UDETA and epoxy units of the polymer. Blends 2 to 4 correspond to stoichiometries of 0.5, 0.75 and 1.2 respectively, expressed as UDETA/epoxy molar ratio. The grafting reaction of the primary amine of UDETA with the epoxy units is fast and takes place at moderate temperatures (typically of less than 100° C.). In order to obtain the chemical crosslinking using the UDETA, the resulting secondary amine of a first epoxy/UDETA reaction has to again react with an epoxy group of another polymer chain. Another possibility is that it is the hydrogen of the imidazolidone ring which is involved, after the first epoxy/UDETA reaction, in a second stage of reaction with an epoxy of another chain. In all the cases, the second reaction is slower and takes place at a higher temperature. In order to control the degree of chemical crosslinking with respect to the functionalization (simple grafting with UDETA) which takes away the possibility of establishing hydrogen (physical) bonds, the stoichiometry and also the annealing temperature of the blend are adjusted. The change in the moment in the rheometer as a function of the temperature for the various blends is shown in table III.

TABLE III

| Product | Blend 1 Moment (dN m) | Blend 2 Moment (dN m) | Blend 3 Moment (dN m) | Blend 4 Moment (dN m) |
|---|---|---|---|---|
| 40° C. | 29 | 27 | 27 | 30 |
| 50° C. | 16 | 20 | 16 | 15 |
| 75° C. | 17 | 21 | 18 | 15 |
| 100° C. | 19 | 24 | 22 | 16 |
| 150° C. | 25 | 32 | 30 | 19 |
| 200° C. | 28 | 36 | 35 | 20 |
| 220° C. | 23 | 35 | 32 | 15 |

This table shows that the blends having a stoichiometry which is deficient in UDETA (0.5 and 0.75) result in the highest moments, whereas the blends having UDETA/epoxy equivalence and an excess of UDETA exhibit lower moments. This is because the blends comprising 0.5 and 0.75 UDETA/epoxy are more liable to crosslinking chemically, the epoxy groups being in excess and being able to react more easily a second time with the UDETA. The blends with the ratios 1 and 1.2 will be essentially crosslinked physically, the epoxy groups having been consumed by the first UDETA grafting reaction. It is also advantageous to point out that the blends having very predominantly physical crosslinking (blends 1 and 4) exhibit a marked fall in the moment at high temperature (>200° C.), which reveals the progressive dissociation of the physical bonds at this temperature, whereas the blends exhibiting a good proportion of chemical crosslinking have a tendency to retain a virtually constant moment or one which decreases less. These examples clearly show the advantage of combining permanent chemical crosslinking and physical crosslinking in order to obtain materials with varied properties tailor-made according to the applications.

What is claimed is:

1. An elastomer material comprising flexible polymer chains associated by means comprising a) crosslinking bridges having covalent bonds and b) crosslinking bridges having noncovalent bonds,
   the elastomer material having been crosslinked at epoxy functional groups carried by the flexible polymer chains, and
   the flexible polymer chains having been grafted with 2-aminoethylimidazolidone (UDETA),
   wherein the molar ratio of UDETA/epoxy is deficient in UDETA.

2. The material of claim 1 wherein the flexible polymer chains are selected from the group consisting of poly(styrene-b-butadiene) (SB), poly(styrene-b-butadiene-b-styrene) (SBS), poly(styrene-b-isoprene-b-styrene) (SIS), poly(styrene-b-isoprene-b-butadiene-b-styrene) (SIBS), hydrogenated SBS (SEBS), poly(styrene-b-butadiene-b-methyl methacrylate) (SBM) or its hydrogenated version (SEBM), copolymers of ethylene, acrylic ester and maleic anhydride, copolymers of ethylene, acrylic ester and functional acrylicester selected from glycidyl acrylate and glycidyl methacrylate , and blends thereof.

3. The material of claim 1 wherein flexible polymer chains comprise diene elastomers.

4. A process for the preparation of a crosslinked material from flexible polymer chains comprising at least the steps of: (a) crosslinking said polymer chains with covalent bonds at epoxy functional groups carried by the flexible polymer chains; and (b) grafting said polymer chains with 2-aminoethylimidazolidone (UDETA),
   wherein the molar ratio of UDETA/epoxy is deficient in UDETA.

5. The process of claim 4 wherein the UDETA is present in an amount of 0.1 to 20% by weight based on the polymer.

6. The process of claim 4, wherein steps a) and b) can be carried out in any order or be simultaneous.

7. An article made from the elastomer material of claim 1, wherein the article is selected from leak tight seals, thermal or acoustic insulators, tires, cables, sheaths, footwear soles, packaging, coatings, patches, systems for trapping and releasing active principles, dressings, elastic clamp collars, vacuum pipes, pipes or flexible tubing for transportation of fluids, adhesive or cosmetic compositions, or ink, varnish or paint formulations.

8. The material of claim 1, wherein the flexible polymer chains are selected from the group consisting of polybutadiene, polychloroprene, or their hydrogenated forms; polyisobutylene; block copolymers having groups of butadiene and styrene, or isoprene and styrene, or butadiene, isoprene and styrene, or their hydrogenated forms; random copolymers having butadiene and styrene, or butadiene and acrylonitrile or their hydrogenated forms; ethylene/propylene/diene copolymers; copolymers of ethylene, acrylic ester and maleic anhydride, copolymers of ethylene, acrylic ester and functional acrylic ester selected from glycidyl acrylate and glycidyl methacrylate; poly(methyl methacrylate-b-butyl acrylate-b-methyl methacrylate) (MAM); poly(styrene-b-butyl acrylate-b-styrene) (SAS); copolymers of ethylene, vinyl acetate and maleic anhydride; and blends thereof.

9. The process of claim 4, wherein the flexible polymer chains are selected from the group consisting of polybutadiene, polychloroprene, or their hydrogenated forms; polyisobutylene; block copolymers having groups of butadiene and styrene, or isoprene and styrene, or butadiene, isoprene and styrene, or their hydrogenated forms; random copolymers having butadiene and styrene, or butadiene and acrylonitrile or their hydrogenated forms; ethylene/propylene/diene copolymers; copolymers of ethylene, acrylic ester and maleic anhydride, copolymers of ethylene, acrylic ester and functional acrylic ester selected from glycidyl acrylate and glycidyl methacrylate; poly(methyl methacrylate-b-butyl acrylate-b-methyl methacrylate) (MAM); poly(styrene-b-butyl acrylate-b-styrene) (SAS); copolymers of ethylene, vinyl acetate and maleic anhydride; and blends thereof.

* * * * *